United States Patent [19]
MacDonald et al.

[11] 3,955,964
[45] May 11, 1976

[54] PROCESS FOR MAKING STEEL

[75] Inventors: Somerled MacDonald, Sewickley; Walther H. Mathesius, Beaver, both of Pa.

[73] Assignee: Koppers Company, Inc., Pittsburgh, Pa.

[22] Filed: Aug. 30, 1971

[21] Appl. No.: 175,956

[52] U.S. Cl. .................................... 75/13; 75/49; 75/60
[51] Int. Cl.² .................................... C21C 5/52
[58] Field of Search ............... 75/11, 12, 13, 46, 49, 75/60, 61; 266/13; 13/9, 2

[56] References Cited
UNITED STATES PATENTS

| | | | |
|---|---|---|---|
| 3,336,020 | 8/1967 | Palsak ................................ | 266/5 R |
| 3,444,304 | 5/1969 | Longenecker .......................... | 13/9 |
| 3,501,290 | 3/1970 | Finkl et al. .......................... | 75/12 |
| 3,502,313 | 3/1970 | Pastorius ............................. | 266/13 |
| 3,556,770 | 1/1971 | Post et al. .......................... | 75/49 |
| 3,612,740 | 10/1971 | Gierek et al. ........................ | 13/9 |

*Primary Examiner*—M. J. Andrews
*Attorney, Agent, or Firm*—Stanley J. Price, Jr.; Oscar B. Brumback; Olin E. Williams

[57] ABSTRACT

A versatile steelmaking method and apparatus therefor including both electric-arc furnace and basic-oxygen furnace capabilities. Iron and steel scrap is charged to an open top metallurgical vessel and there preheated, if desired, with a flame, such as fuel-oxygen or fuel-air flame. Thereafter an electrode-bearing vessel roof may be placed upon the open top vessel and the steel charged therein further heated and melted to a desired degree by means of electrically generated heat in the electrodes. The vessel and heated charge may then be advanced to an oxygen blowing station where molten iron and basic slag-making additives may be charged to the vessel. A removable vessel extension is placed upon the top vessel and the total charge refined into steel by means of a high velocity stream of high purity oxygen passing from an oxygen lance into the charge. The steel thus prepared may then be further processed in conventional fashion into billets, slabs and the like, or may be subjected to vacuum degassing and charged to a continuous casting machine. In one embodiment a versatile steelmaking process having both electric-arc furnace and basic-oxygen furnace capabilities and apparatus therefor is provided having a plurality of processing stations including charging, melting and refining station. Those stations may be employed simultaneously in varying sequences, e.g., either in series, in parallel, or in both for preparing a desired steel product.

7 Claims, 3 Drawing Figures

PROCESS FOR MAKING STEEL

BACKGROUND OF THE INVENTION

1. Field of the Invention

This invention relates to steelmaking, and more particularly to a versatile steelmaking method and apparatus having both electric-arc furnace and basic-oxygen furnace capabilities.

2. Description of the Prior Art

The face of the steelmaking industry in the United States and throughout the world has changed considerably in the past 20 years due to widespread acceptance of the basic-oxygen process. In that steelmaking process a charge of steel scrap, molten iron, and slag-making additives in an open top metallurgical vessel is refined into steel by means of a high velocity stream of high purity oxygen issuing at near supersonic velocity from a lance extending into the vessel in a manner whereby oxygen passes downwardly and into the molten charge. The process now enjoys a greater annual tonnage production than basic open hearth steelmaking, long the mainstay of the industry. With the basic-oxygen process it is possible to prepare 200 tons or more of steel in as little as 30 minutes. By way of comparison, the basic open hearth process would consume at least several hours to prepare the same tonnage of steel.

In addition to the basic-oxygen process, the electric-arc process of manufacturing steel is likewise seeing ever increasing usage in the steel industry. In the electric-arc process, a solid charge, typically steel scrap, is placed in an open top metallurgical vessel having a rather broad dish-shape character. An electrode-bearing roof is placed upon the open top vessel to form an electric-arc furnace. The charge is then melted into usable steel by means of electrically generated heat in the electrodes. The electric-arc steelmaking process has certain advantages over the basic-oxygen steelmaking process. Chiefly, the electric-arc process utilizes a high percentage of steel scrap in the furnace charge. In fact, the charge may be substantially 100% steel scrap. The basic-oxygen process cannot ordinarily accept more than about 30% by weight solid scrap in the furnace charge, unless special measures are used. This limitation is due to the fact that the basic-oxygen process derives most of the heat required for refining by exothermic chemical reactions of the oxygen blown into the vessel with oxidizable impurities in the charge, chiefly carbon and silicon. Additionally, the basic-oxygen process has not been successfully used to make many grades of alloy and special steels for which it appears to be unsuitable. Both basic-oxygen and electric-arc steelmaking are batch processes and have the disadvantages of a batch-type operation.

This invention provides a versatile steelmaking process and apparatus therefor which has both basic-oxygen furnace and electric-arc furnace capabilities. The method and apparatus of the invention have the advantages of each of the foregoing processes and substantially overcome their respective disadvantages. In addition, the method of the invention may provide a continuous or semi-continuous steel-making practice by which almost any desired grade of steel may be manufactured. The method of the invention provides combined electric-arc furnace and basic-oxygen furnace steelmaking, and are versatile such that ordinary basic-oxygen furnace steel-making practices may be employed within the method where desired. Moreover, the invention provides novel steelmaking practices and steelmaking plant designs whereby steel of varying quality and compositions may be produced in a rapid and economical fashion.

SUMMARY OF THE INVENTION

This invention provides versatile steelmaking method and apparatus therefor having both electric-arc furnace and basic-oxygen furnace capabilities whereby steel of desired quality and composition may be prepared. According to the invention, steel scrap is charged to an open top metallurgical vessel an preheated, if desired, with a flame such as a fuel-oxygen or fuel-air flame. The metallurgical vessel is of a design especially adapted for use in the invention and generally comprises a refractory-lined open top vessel adapted to be moved or advanced to various processing stations, and additionally adapted to receive various removable roofs. After preheating, the mobile vessel and steel scrap charge are advanced to an electric-arc station where an electrode-bearing roof is placed on the vessel and the charge is melted or partly melted by means of electrically generated heat through the electrodes. Thereafter the vessel and melted, or partially melted, charge may be advanced to an oxygen-blowing station. In one preferred embodiment of the invention the aforementioned preheating stations, i.e., flame preheating and electric-arc melting stations, are located along a line whereby the mobile metallurgical vessel and charge may be readily advanced from station to station. Upon reaching the oxygen-blowing station molten iron is charged to the vessel. A removable vessel extension is provided and placed upon the mobile metallurgical vessel whereby the vessel walls are extended upwardly. A total charge in the vessel comprising melted or partially melted steel scrap, molten iron, and slag-making additives is refined into steel by means of a high velocity stream of high purity oxygen passing from an oxygen lance into the charge. The slag-making additives are added to the charge after the molten iron has "ignited" by contact with oxygen. After oxygen refining the mobile metallurgical vessel and steel prepared therein is removed from its collar and further advanced away from the oxygen-blowing station. The steel therein may then be deslagged and subjected to vacuum degassing. In a preferred method, deslagging and vacuum degassing are performed at a station provided in line with those foregoing stations. The finished molten steel may be charged to a continuous casting machine provided directly in line with the steelmaking process line as thus far described.

In one embodiment, a plurality of mobile vessels of the type described is employed in the invention whereby steel in various advancing stages of preparation is found along a process line. In another embodiment, a versatile steelmaking process having both electric-arc furnace and basic-oxygen furnace capabilities and apparatus therefor is provided having a plurality of processing stations including charging, melting and refining stations. Those stations may be employed simultaneously in varying sequences for preparing a desired steel product. It will become apparent as the specification proceeds that the methods and apparatus of the invention permit steelmaking practices more versatile and flexible than any heretofore known. Alloy grades of steel can be prepared as well as ordinary low carbon steels. Almost any proportion of solid steel scrap to hot metal may be employed according to the practices of the invention, subject only to the requirements or preferences in a particular operating installation. Moreover, should product specifications, availability of raw materials, etc. so require, the steelmaking practices of the invention may be employed to refine steel by either electric-arc furnace or basic-oxygen furnace techniques. Other advantages and details of the invention will become apparent by reference to the appended drawings and as the following more detailed description thereof proceeds.

DESCRIPTION OF THE PREFERRED EMBODIMENTS

Figure 1:
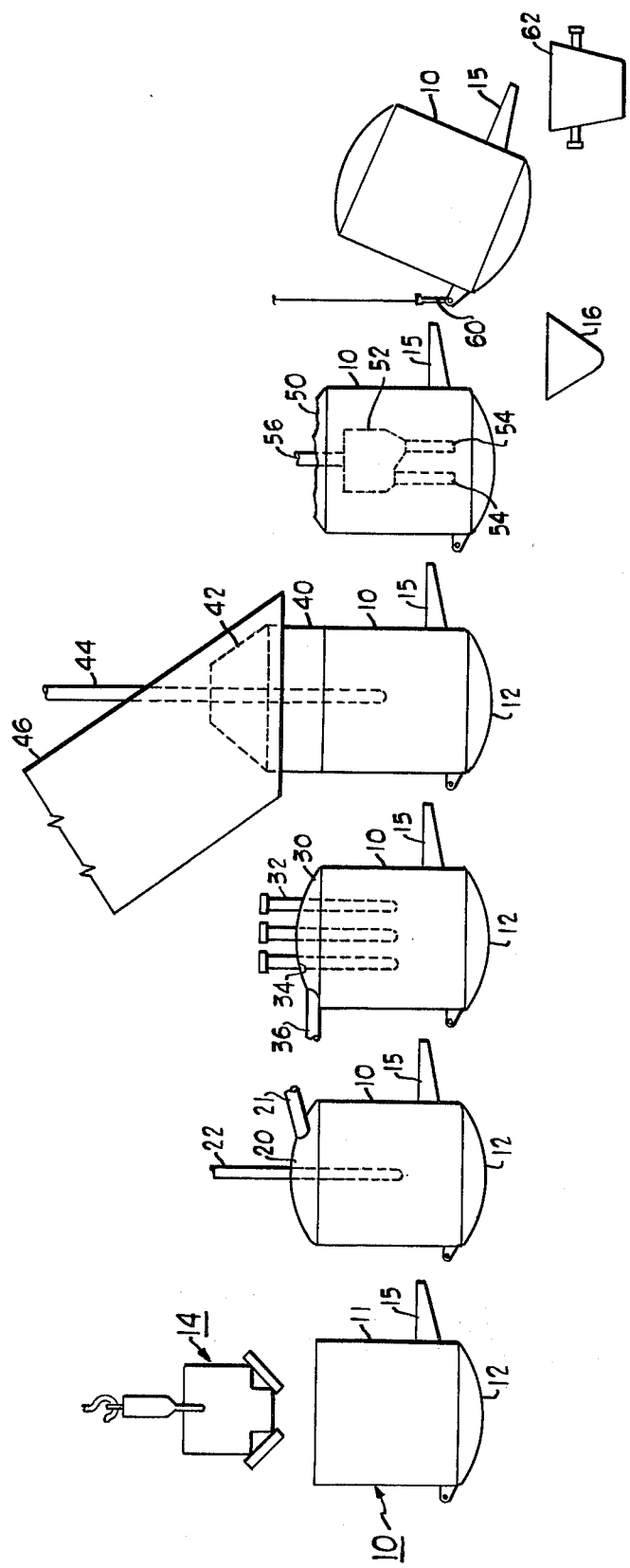
FIG. 1 is a schematic process representation of steelmaking practice according to the invention.

Referring now to FIG. 1, a versatile, mobile metallurgical vessel 10 is shown. Vessel 10 has upwardly extending side walls 11, a dish-shaped bottom 12, and has a generally circular cross section. Side walls 11 of vessel 10 preferably extend upwardly to a height substantially the same as that of an ordinary electric furnace, chiefly to contain the vessel charge. A tap-hole or spount 15 is provided in vessel 10 through which molten steel and slag may be later withdrawn. A charging bucket 14 is provided for charging steel scrap and the like to vessel 10. The steel scrap charge may or may not be preheated prior to charging to vessel 10 as desired or required by the heat balance of the process. A suitable charging bucket wherein the charge may be preheated is described in U.S. Pat. No. 3,439,909 assigned to the assignee of the present invention.

Vessel 10 is mobile and may be advanced to succeeding stations as in FIG. 1. The means of conveying or advancing vessel 10 may comprise an ordinary rail-mounted carriage with drive means for advancing vessel and charge. Vessel 10 may be operably mounted on the rail by conventional means, for example, through a trunion.

Vessel 10 containing a steel scrap charge, or the like, may next be advanced to a preheat station. Vessel 10 is adapted to receive a removable vessel roof 20 for preheating. Removable roof 20 is provided with a vent or exhaust port 21 and is adapted to receive a lance-type burner 22. Lance 22 may be a fuel/air lance or a fuel/oxygen lance for producing an extremely hot flame for preheating of the solid charge in vessel 10. The preheat will, of course, remove any water present which can cause dangerous explosions on contact with molten metal.

After preheating of the solid charge in vessel 10, roof 20 and lance 22 are removed and the vessel and charge advanced to an electric-arc station as in FIG. 1. Vessel 10 is adapted to receive in sealing fashion an electrode-bearing roof 30. Electrode-bearing roof 30 is removable and is adapted to receive electrodes 32 through openings 34 provided in roof 30. An exhaust vent 36 is provided through which exhaust gasses may pass. Incidentally, any process exhaust gasses, such as those passing through exhaust vents 21 and 36 may be treated in a gas-cleaning system or in a waste-heat recovery system. Electrodes 32 may be of the conventional consumable carbon variety and steelmaking practice at the electric-arc station in the process of the invention may substantially comprise conventional electric-arc furnace practice. At this station the solid steel scrap charge is further heated by means of electricity thermally generated in electrodes 32. The charge in vessel 10 may be heated or melted to any desired degree, or may even be completely melted as is the case in ordinary electric-arc steelmaking. Thereafter, electrode-bearing roof 30 is removed from vessel 10 and the molten or partially molten charge therein further processed.

In FIG. 1, mobile metallurgical vessel 10 and charge are next advanced to an oxygen-blowing station. At the oxygen-blowing station additional raw materials, namely molten iron and basic slag-making additives, are charged to the vessel. It will be appreciated that the quantity of molten iron charge will naturally be based upon the heat balance in the system as determined largely by the composition of the molten iron and the composition and temperature of the molten or partially molten charge already in vessel 10. It can be seen that because of the molten state and temperature of the original steel scrap charge to the process that considerably more than 30% by weight of the total charge can comprise steel scrap. Thus the oxygen-blowing station practice is not restricted to the approximate 30% limit ordinarily associated with oxygen-blowing. Additionally it can now be appreciated that almost any scrap-to-hot-metal (molten iron) proportion can be accommodated by the methods of the invention. Such is the process' versatility that its production is not limited by relative availability of molten iron or steel scrap but can yield steel of desired quality regardless of such raw material availability.

Vessel 10 is adapted to receive a removable vessel extension 40. Vessel extension 40 may have an inwardly converging upper portion 42 similar to that of conventional basic-oxygen converters. In that fashion splashing and spilling of steel is kept to a minimum during refining. Inwardly converging collar portion 42 is adapted to receive a lance 44 which extends downwardly into metallurgical vessel 10. High purity oxygen passes through lance 44 and issues from a nozzle (not shown) at the discharge end of lance 44 at high velocity in a manner whereby oxygen may pass into the molten charge. Refining takes place by chemical reaction of oxygen with constituents, chiefly carbon and silicon, present in the molten iron. Exhaust gasses from the refining process are collected through hood means 46 provided at the oxygen-blowing station. After oxygen refining has been completed, lance 44 is withdrawn from vessel 10.

Vessel 10, now containing refined molten steel and slag may then be removed from vessel extension 40 and advanced to a vacuum degassing station. There slag may be withdrawn from the vessel through tap-hole 15 into slag-pot 16. Vacuum degassing of the molten steel may be substantially according to conventional practice. Vessel 10 is adapted to sealably receive a removable roof 30. A suitable vacuum degassing apparatus 52 is provided, such as the Ruhrstahl-Heraeus apparatus shown in the Figure and lowered into vessel 10. That apparatus is more fully described in *Making, Shaping, and Treating of Steel*, 8th edition (1964), page 554, and includes inlet ports 54 and outlet port 56 for exhausting gasses from the molten charge.

After degassing of the molten steel in vessel 10, the vessel may be tapped. In FIG. 1 a tilting apparatus 60 is provided for tilting vessel 10 whereby molten steel may pour through tap-hole or spout 15. In the Figure steel may flow into tapping-ladle 62. Alternatively vessel 10 may be tapped directly into the feeding portion of a continuous casting machine (not shown).

It will be appreciated that the steelmaking practice of the invention, as thus far described with respect to FIG. 1, permits of the refining of a charge of varying compositions into steel, in a manner whereby the entire steelmaking process occurs within the same identical vessel. In a preferred embodiment of the invention a plurality of vessels 10 are employed whereby steel in various stages of advancing processing, is found simultaneously along the process line. In that fashion the invention provides a continuous or semicontinuous steelmaking process. Steel from the process may continuously be tapped into a casting machine or the like to provide finished steel in a rapid and economical fashion.

Moreover, the process as shown in FIG. 1 permits of an almost unlimited variation of steelmaking practices. For example, if a particular alloy grade of steel is required which does not permit of oxygen-blowing, the oxygen-blowing station may be bypassed by vessel 10 with refining occurring entirely in the electric-arc furnace station. The oxygen-blowing station is, however, available should an oxygen blow be required for the finished steel. If an ordinary basic-oxygen conversion is desired, for example, due to unavailability of large amounts of steel scrap or if a fuel-oxygen preheat or partial melt of the scrap charge is sufficient for heat balance purposes, the electric-arc station may be bypassed. Preferably most or all of the stations as shown are located directly in line such that a single straight track may be employed for advancing the vessel, or each of a plurality of vessels, along the process line.

Figure 2:
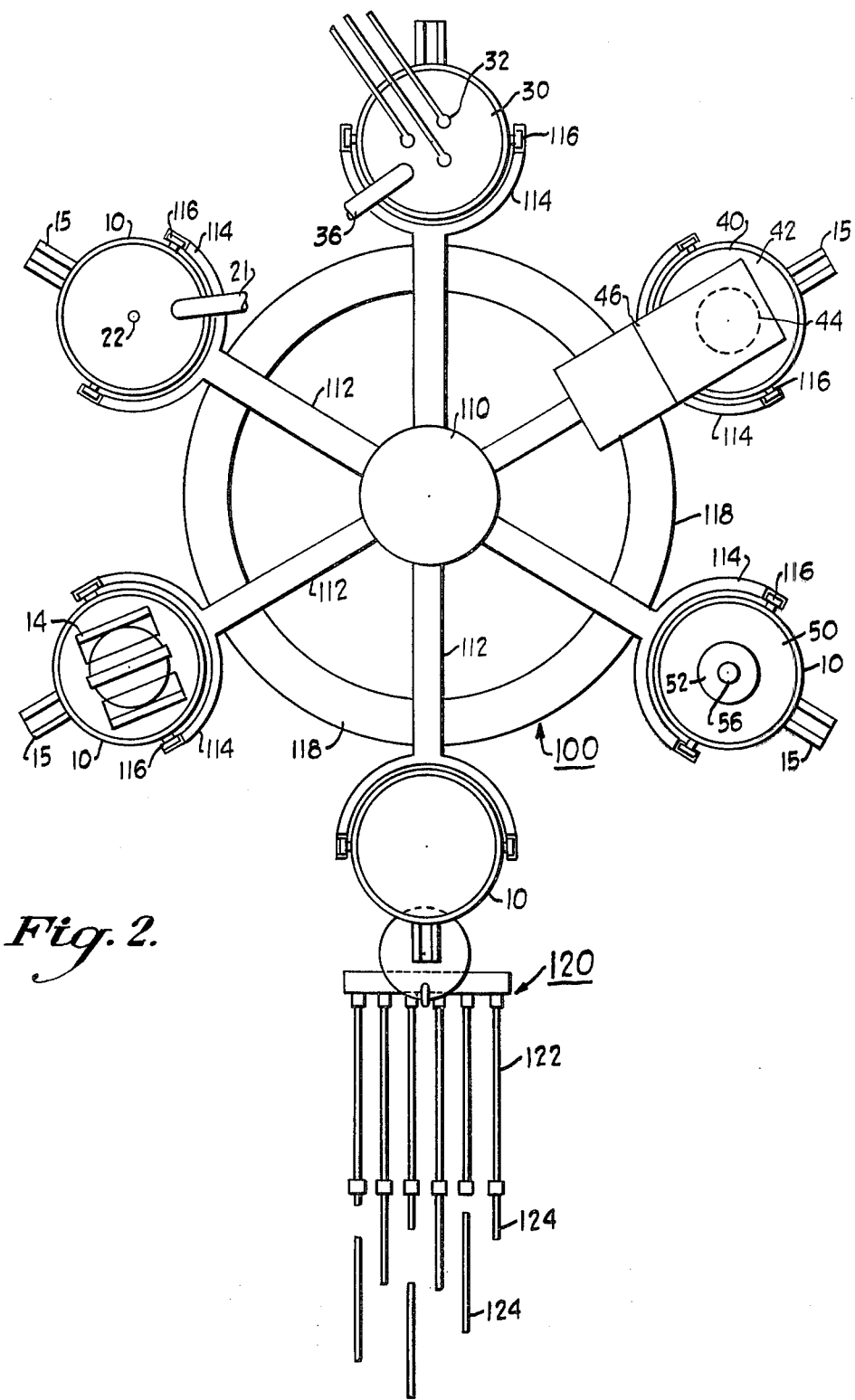
FIG. 2 is an alternative preferred steelmaking method according to the invention wherein a steelmaking vessel according to the invention is mobilized through a turntable.

In FIG. 2 an alternate preferred form of the invention is shown. A plurality of vessels 10 of the type substantially as described hereinabove are provided mounted in operable arrangement on turntable means 100. Turntable drive means 110 is provided having a plurality of turntable support-arms extending therefrom. Support-arms 112 are mounted for rotation on a turntable support track 118. Each support-arm 112 includes means for supporting a vessel 10. Such support means may include trunion ring means 114 for pivotally supporting shafts 116 rigidly affixed to vessels 10. In that fashion a vessel 10 on support-arms 112 may be tilted for tapping or the like and may be readily removed from a trunion support ring 114 for relining, repair, etc. In FIG. 2 steelmaking according to the invention wherein a combination of electric-arc and basic-oxygen steelmaking is employed, steelmaking in various stages of production is shown. A charging bucket 14 may charge a metallurgical vessel 10 with steel scrap. Vessel 10 is suspended in trunion ring support 114 from a turntable support-arm 112. After charging vessel 10 with steel scrap, turntable drive means 110 may be activated whereby the vessel having scrap charged therein may advance clockwise in FIG. 2 to a preheating station located on the periphery of turntable 100. There vessel 10 is fitted with removable roof 20 having an exhaust vent 21 and adapted to receive a lance-type burner 22. The removable roof, exhaust vent, and lance may be the type described with reference to FIG. 1. After preheating has been completed, drive motor 110 is again activated to advance vessel 10 and its preheated charge to an electric-arc station where electric-arc melting or partial melting of the charge takes place. Electric-arc melting practice is as previously described wherein the steel scrap charged to vessel 10 is melted through electrically generated heat in electrodes 32 provided in removable vessel roof 30. Subsequent to electric-arc melting, electrode-bearing roof 30 is removed and vessel 10 advanced to the oxygen-blowing station where molten iron and slag-making additives are charged. Removable vessel collar portion 40 having inwardly converging upper portion 42 is fitted upon vessel 10, and the total charge is refined into steel by means of oxygen passing downwardly into the charge through lance 44. Here again, off-gasses from the refining process are collected in hood 46. Vessel and molten steel may then be advanced to a deslagging and vacuum degassing station. There slag may be poured from the vessel through tapping spout 15 and the molten steel degassed with degassification apparatus 52 extending through removable roof 50. Thereafter the finished steel may be advanced by rotation of turntable 100 to a teeming or casting station. In FIG. 2 finished steel is tapped directly into the feeding section of a continuous casting apparatus 120 where molten steel is cast into strands 122 of desired shapes and forms. If desired, strands 122 may be thereafter further processed as, for example, by cutting into billets 124 of desired length.

The steelmaking practice shown in FIG. 2 has certain advantages over that shown in FIG. 1. Each method, of course, is a versatile steelmaking process according to the invention employing both electric-arc steelmaking and basic-oxygen steelmaking capabilities. The turntable method of FIG. 2 has the advantage that a single charging station can charge each vessel 10 as it reaches the charging station via rotation of turntable 100 after having been depleted of finished steel at the casting station. And, since the turntable method of FIG. 2 is preferably operated with a plurality of vessels 10 whereby each of the various stations around the turntable is performing its designated function simultaneously, the turntable method is not quite as flexible as the method shown in FIG. 1. The turntable method will be capable of producing high tonnages of a single grade of steel, and as such would provide an almost continuous steelmaking process.

Figure 3:
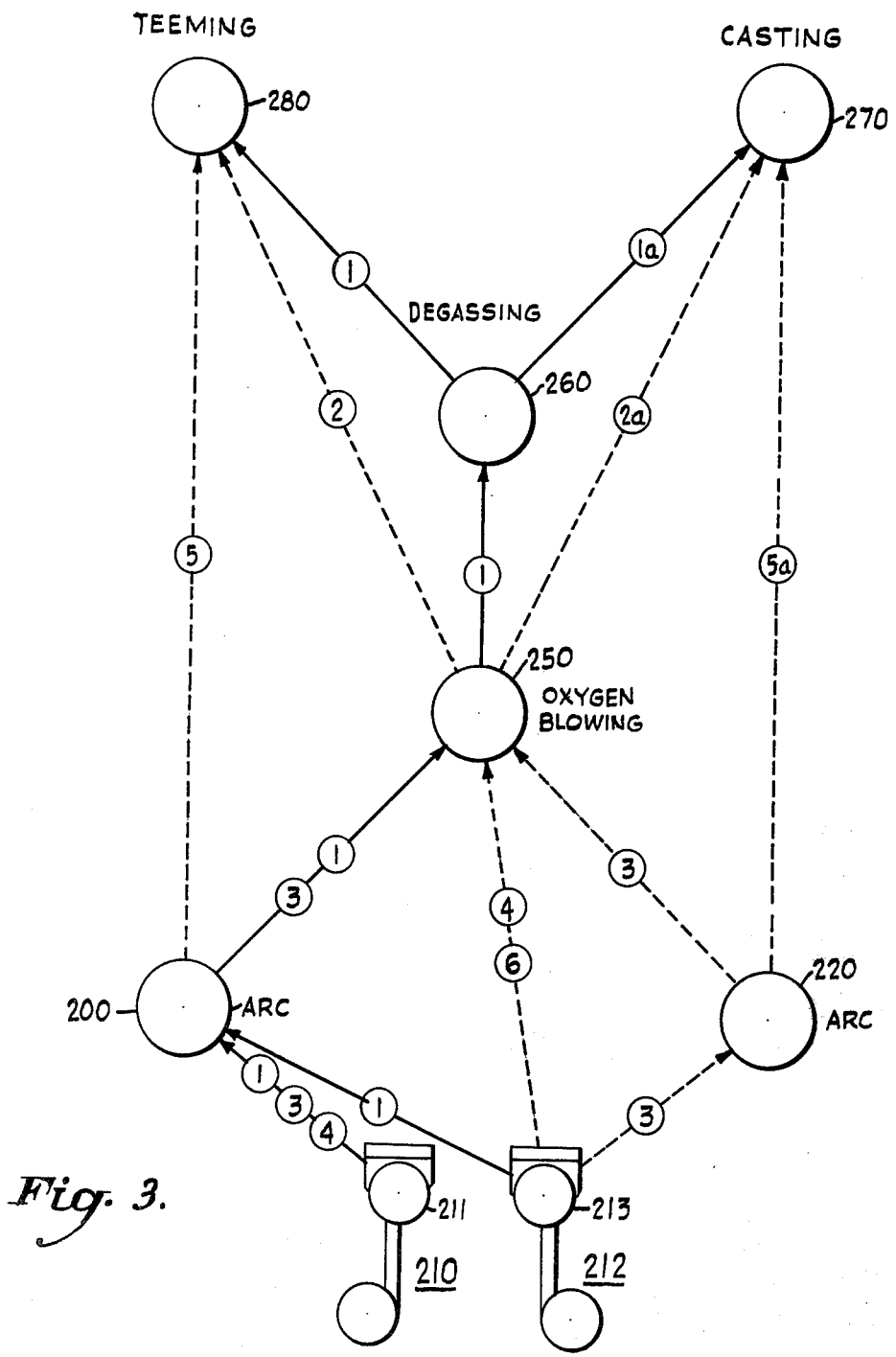
FIG. 3 is a flow sheet demonstrating the versatility of a steelmaking practice according to the invention.

FIG. 3 is a flow chart demonstrating the steelmaking versatility of a steelmaking plant employing independently movable containers in connection with steelmaking having both electric-arc and basic-oxygen steelmaking capabilities according to the invention. In FIG. 3 are shown the various processing stations including a pair of charging stations 210 and 212, a pair of electric-arc stations 200 and 220, an oxygen-blowing station 250, a degassing station 260, a casting station 270, and a teeming station 280. The charging stations 210 and 212 are shown having preheating charging boxes of the type described in U.S. Pat. No. 3,439,909 mentioned hereinabove, wherein steel scrap may be efficiently preheated. Various Routes are shown, designated by numbers one (1) through six (6), by which steel may be prepared in the steelmaking system illustrated. In Route 1 preheated scrap from both preheating charging boxes 211 and 213 is charged to a vessel of the type described and thereafter subjected to electric-arc melting to wholly or partly melt the charge. The vessel may then move to oxygen-blowing station 250 for refining after adding molten iron and slag-making additives. After oxygen refining, the vessel is advanced to a vacuum degassing station 260 and finally poured into a ladle at the teeming station 280 or, alternatively, into a casting machine (Route 1A) at casting station 270. It should be recognized that when a plurality of vessels are employed, five separate "heats" are being made or poured simultaneously while scrap for a sixth heat is being preheated. In addition, the second arc station 220 may be producing an ordinary electric furnace heat at the same time (Routes 5 or 5A).

Steelmaking via Route 2 is identical to that of Route 1 with the exception that the vacuum degassing station 260 may be bypassed. Route 3 provides a steelmaking method where preheated scrap is simultaneously charged to each of two movable vessels. Thereafter the vessels are advanced to electric arc stations 200 and 220 and simultaneously subjected to electric-arc melting or partial melting. Route 3 permits, of course, more melting of scrap than the process of Route 1 and hence requires less molten iron for the oxygen-blowing station. In Route 4 one vessel containing preheated scrap is sent to oxygen-blowing station 250. A choice between Route 4 and, for example, Routes 1 and 3, will depend upon the time-temperature-scrap balance. Route 5 provides an ordinary electric furnace heat, especially useful, for example, where certain alloy grades of steel are being prepared. Route 6 designates an ordinary basic-oxygen heat with or without preheated scrap. In this case both arc units 200 and 220 can be operating simultaneously making ordinary electric furnace heats via Route 5. In a sense, Routes 5 and 6 and reciprocals. Additionally, it is possible that all scrap preheating take place in the arc units at electric-arc stations 200 and 220. It will be appreciated that a steelmaking plant incorporating the methods and plan of the invention as shown in FIG. 3, or similar thereto, is an extremely versatile steelmaking facility. In that plant it is possible to use almost any ratio of steel scrap to hot metal. Likewise it is possible to produce steel of all grades and quality. Moreover, the novel methods can utilize nearly any known starting materials for producing steel by electric arc furnace or basic oxygen furnace techniques. For example, pre-reduced steel pellets either with or without occluded carbon can be used in place of scrap, and iron oxide or millscale may be used as a coolant at the oxygen-blowing station if the process heat balance should require.

The foregoing has described the novel methods and apparatus of the invention and certain preferred embodiments thereof. It is to be expressly understood, however, that the invention is not necessarily limited to the specific embodiments described therein, but may be variously practiced within the scope of the following claims.

We claim:

1. A process for making steel having both electric arc and basic-oxygen furnace capabilities comprising,
    charging steel scrap into a vessel at a charging station,
    thereafter advancing said vessel to an electric arc station,
    melting at least a portion of said steel scrap in said vessel by means of electrically generated heat in electrodes positioned in said vessel at said electric arc station to form molten scrap steel,
    charging molten iron and slag-making additives to said molten scrap steel in said vessel,
    thereafter advancing said vessel to an oxygen blowing station, and
    subjecting said charge of molten iron, slag-making additives, and scrap steel in said vessel at said oxygen blowing station to a high velocity stream of oxygen whereby said charge is refined into steel.

2. The steelmaking process as set forth in claim 1 including preheating said charge of scrap steel at a preheating station and thereafter advancing said vessel to said electric arc station.

3. The process as set forth in claim 1 including thereafter advancing said vessel with said steel therein to a vacuum degassing station where said steel is subjected to vacuum degassing.

4. The process as set forth in claim 3 including advancing said vessel from said vacuum degassing station to a continuous casting machine and tapping said steel in said vessel into said continuous casting machine.

5. The steelmaking process as set forth in claim 1 including a plurality of vessels whereby more than one of said vessels is positioned at certain of said stations simultaneously.

6. The process as set forth in claim 5 wherein said stations are located along a circumference of a circle.

7. The process as set forth in claim 6 wherein said vessels are advanced to another of said stations by a turntable means.

* * * * *